(12) United States Patent
Stutton et al.

(10) Patent No.: US 7,519,806 B2
(45) Date of Patent: Apr. 14, 2009

(54) VIRTUAL PARTITION FOR RECORDING AND RESTORING COMPUTER DATA FILES

(75) Inventors: Robert Stutton, Northcote (NZ); Abraham Dowd, Western Springs (NZ); Charles Warner, Balmoral (NZ); Aaron Koolen, Mt. Albert (NZ); Andrew Stephens, Pt. Chevalier (NZ); Charles Truell, Mt. Eden (NZ); Sean Connolly, Riverhead (NZ)

(73) Assignee: Symantec Corporation, Cupertino, CA (US)

( * ) Notice: Subject to any disclaimer, the term of this patent is extended or adjusted under 35 U.S.C. 154(b) by 463 days.

(21) Appl. No.: 11/356,906

(22) Filed: Feb. 16, 2006

(65) Prior Publication Data
US 2006/0143433 A1   Jun. 29, 2006

Related U.S. Application Data

(62) Division of application No. 10/284,827, filed on Oct. 30, 2002, now Pat. No. 7,032,107.

(51) Int. Cl.
*G06F 9/00* (2006.01)
(52) U.S. Cl. .................... 713/2; 713/1; 713/100
(58) Field of Classification Search .......... 713/2, 713/1, 100
See application file for complete search history.

(56) References Cited

U.S. PATENT DOCUMENTS

| | | | |
|---|---|---|---|
| 5,604,890 A * | 2/1997 | Miller | 703/23 |
| 6,192,471 B1 * | 2/2001 | Pearce et al. | 713/2 |
| 6,473,655 B1 * | 10/2002 | Gould et al. | 700/5 |
| 6,615,303 B1 * | 9/2003 | Endo et al. | 710/260 |
| 6,715,016 B1 * | 3/2004 | Ohno et al. | 710/260 |

* cited by examiner

*Primary Examiner*—Thomas Lee
*Assistant Examiner*—Vincent T Tran
(74) *Attorney, Agent, or Firm*—Fenwick & West LLP

(57) ABSTRACT

Some computer operating systems do not permit application programs to perform certain tasks. If there is a desire to perform a forbidden task, a virtual partition (228) is created (610) in a storage device (108), such as a hard disk drive, associated with the computer system (100). The virtual partition (228) is stored as a file within the file system of the storage device (108). Operating system files (414) are installed in the virtual partition (228), and the storage device (108) is configured (616) to boot the computer system (100) using the operating system in the virtual partition. When the task is complete, the computer system (100) is configured to boot using the operating system other than the one in the virtual partition.

20 Claims, 7 Drawing Sheets

VIRTUAL PARTITION FOR RECORDING AND RESTORING COMPUTER DATA FILES

CROSS-REFERENCE TO RELATED APPLICATIONS

This application is a divisional of U.S. patent application Ser. No. 10/284,827, filed on Oct. 30, 2002, now U.S. Pat. No. 7,032,107 entitled "Virtual Partition for Recording and Restoring Computer Data Files," the entire disclosure of which is hereby incorporated by reference herein in its entirety for all purposes.

BACKGROUND OF THE INVENTION

1. Field of the Invention

This invention pertains in general to storage devices for computer systems and pertains in particular to software tools for accessing hard disk drives and other types of media.

2. Background Art

Modern computer systems, such as personal computer systems, typically include a large persistent storage device, such as a hard disk drive ("hard drive"). A typical hard drive might hold, for example, 120 or 200 gigabytes (GB) of data. The hard drive is often formatted into one or more logical divisions called "partitions." For example, a 120 GB hard drive can be logically divided into two 60 GB partitions. Each partition can hold executable files and other data utilized in the operation of the computer system.

An operating system is typically stored on the hard drive and executed by the computer system. The operating system controls the operation of the computer system and, as part of this task, controls access to the hard drive. Modern operating systems do not provide other applications executing on the computer system with direct access to the hard drive. Instead, the applications must use an application programming interface (API) provided by the operating system to perform tasks such as accessing files.

Among other things, the API enforces a set of policies designed to protect the integrity of the data on the hard drive. Forcing application programs to use the API also allows the operating system to perform background tasks such as journaling, caching, and de-fragmenting the drive. However, the benefits produced by enforcing disk access through the API come at the expense of power and flexibility. Applications executing on the computer system may be prevented by the API from obtaining exclusive access to the disk or modifying files protected by the operating system, and thereby prevented from performing legitimate tasks.

One technique for avoiding the limitations imposed by the API is to perform the tasks on the hard drive before the operating system enforces the access policies. For example, MICROSOFT WINDOWS-based operating systems provide a facility for performing certain file read/write operations at an early stage in a computer's boot process. In this manner, an application can alter files that are locked once the operating system is fully booted.

Another way to avoid the limitations imposed by the API is to boot the computer with another operating system that allows the tasks to be performed. One technique for accomplishing this is to insert a floppy disk containing a different operating system, such as DOS (the "Disk Operating System") into a floppy drive on the computer system and boot the floppy disk's operating system instead of the operating system stored on the hard drive. Once the computer boots to DOS, a DOS-based application program can freely access the hard drive. However, this method is often inconvenient when the end user lacks a floppy disk or the computer system lacks a floppy disk drive. Another technique is to store a customized image of a bootable floppy disk on the hard drive, load the disk image into a logical drive stored in volatile memory (i.e., a RAM disk) and then cause the computer system to load and boot from the RAM disk. However, this solution can be problematic because it requires significant alteration of the normal computer boot process. Plus, applications executing on the computer system can inadvertently disable the boot process or overwrite the memory locations holding the disk image.

Accordingly, there is a need in the art for a way to perform tasks on a storage device of a computer system that are not permitted by the computer system's normal operating system. Preferably, a solution meeting this need will not require the end user to use a floppy disk, require the computer to have a floppy disk drive, or make extensive and vulnerable alterations to the computer system or storage device.

DISCLOSURE OF INVENTION

The above need is met by booting the computer system (100) from an operating system (414) contained within a virtual partition (VP) (228) in the storage device (108). The storage device (108), such as a hard disk drive, is typically divided into one or more logical partitions (216, 218, 220). Each partition (216, 218, 220) is formatted according to a file system, such as FAT16, FAT32, or NTFS. One partition (216) is usually designated as the "boot partition" and contains the operating system (223) and other data utilized to control the computer system (100). A master boot record (MBR) 210 in the storage device (108) includes a partition table (214) that specifies the parameters of the partitions (216, 218, 220) and identifies the boot partition (216).

A VP client (VPC) module (226) includes a VP creation module (310) that creates the VP (228) as a file preferably located in one of the partitions of the storage device (108). In one embodiment, the VP creation module (310) defragments content on the storage device (108) in order to make the VP file (228) contiguous.

A VP formatting module (312) formats the VP file (228) so that its contents emulate a file system. The emulated file system is not necessarily the same as the file system of the partition hosting the VP file (228). In one embodiment, if the VP file (228) is fragmented, the VP formatting module (312) marks the gaps between the fragments as bad file allocation units (e.g., bad clusters) or as belonging to a file in the VP file system. The VP formatting module (312) also installs executable code and data in the VP (228), including an operating system (414), that allow the computer system (100) to boot from the VP. The operating system (414) in the VP (228) allows application modules (416) executing on the computer system (100) to perform tasks not permitted by the operating system (223) normally booted by the computer system (100). An MBR modifier module (314) modifies the MBR (210) to establish the VP (228) as the boot partition and cause the computer system (100) to boot from the VP.

In one embodiment, the application modules (416) utilized when the computer system (100) is booted from the VP (228) include an image restore module (418) and an image create module (420). The image restore module (418) restores an image onto the storage device (108). If (716) the location of the VP file (228) is incompatible with the image being loaded, the image restore module preferably moves (718) the VP to a new location. The image create module (420) creates an image of the storage device (108). The image create module (420) skips (714) the VP file (228) so that the created image does not contain the VP. Once the application modules (416)

have completed their tasks, one embodiment of the present invention restores the MBR (210) to its original state and boots the computer system (100) back to its normal operating system.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

Figure 1:
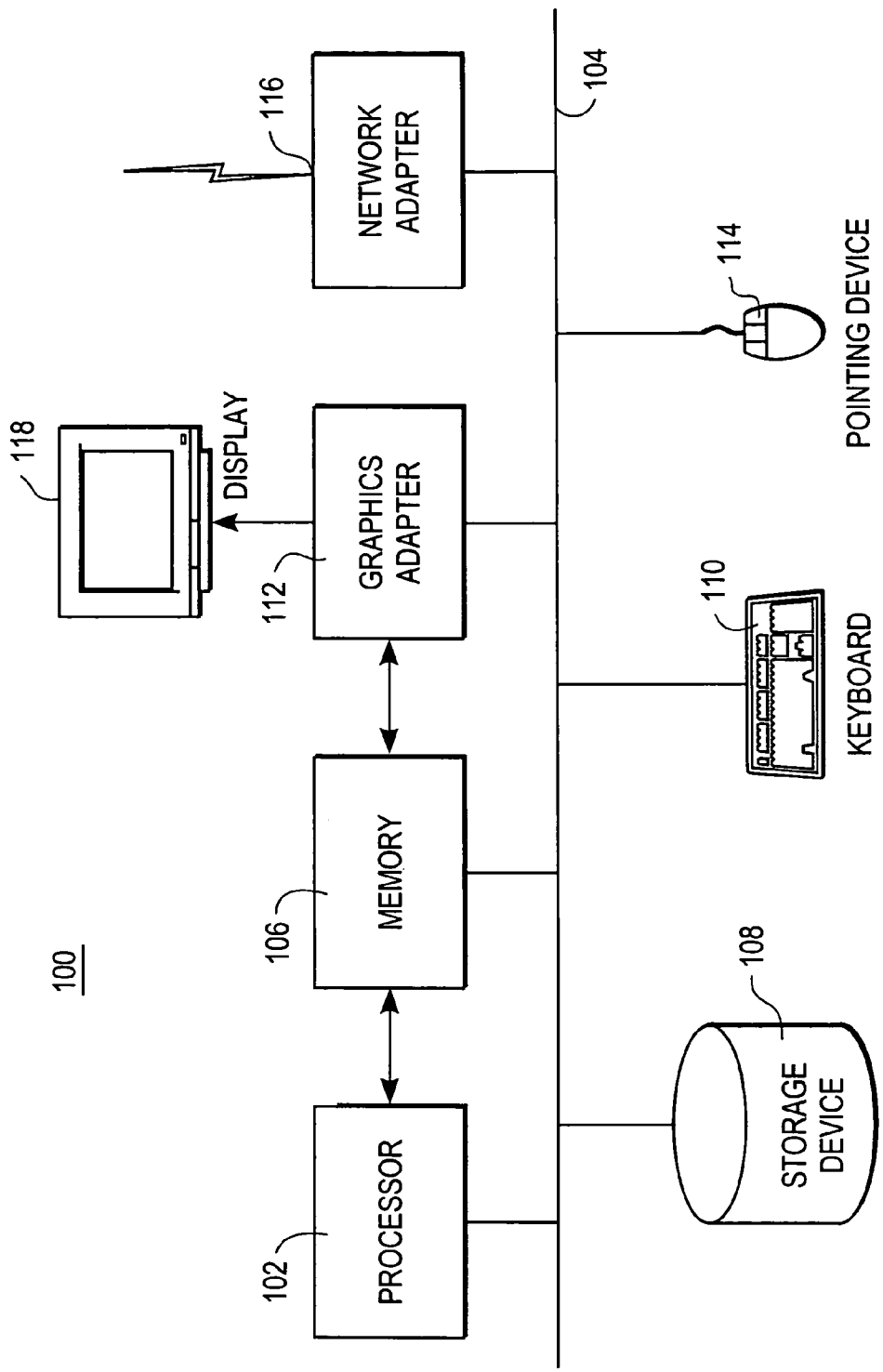
FIG. 1 is a high-level block diagram of a typical computer system 100 for use with a virtual partition (VP) system according to the present invention.

FIG. 1 is a high-level block diagram illustrating a functional view of a typical computer system 100 for use with a virtual partition (VP) system according to one embodiment of the present invention. Illustrated are at least one processor 102 coupled to a bus 104. Also coupled to the bus 104 are a memory 106, a storage device 108, a keyboard 110, a graphics adapter 112, a pointing device 114, and a network adapter 116. A display 118 is coupled to the graphics adapter 112.

The processor 102 may be any general-purpose processor such as an INTEL x86, SUN MICROSYSTEMS SPARC, or POWERPC compatible-CPU. The storage device 108 is, in one embodiment, a hard disk drive but can also be any other device capable of storing data, such as a writeable compact disk (CD) or DVD, or a solid-state memory device. The memory 106 may be, for example, firmware, read-only memory (ROM), non-volatile random access memory (NVRAM), and/or RAM, and holds instructions and data used by the processor 102. The pointing device 114 may be a mouse, track ball, or other type of pointing device, and is used in combination with the keyboard 10 to input data into the computer system 100. The graphics adapter 112 displays images and other information on the display 118. The network adapter 116 couples the computer system 100 to a local or wide area network.

As is known in the art, the computer system 100 is adapted to execute computer program modules for providing functionality described herein. As used herein, the term "module" refers to computer program logic for providing the specified functionality. A module can be implemented in hardware, firmware, and/or software. In one embodiment, the modules are stored on the storage device 108, loaded into the memory 106, and executed by the processor 102.

Figure 2:
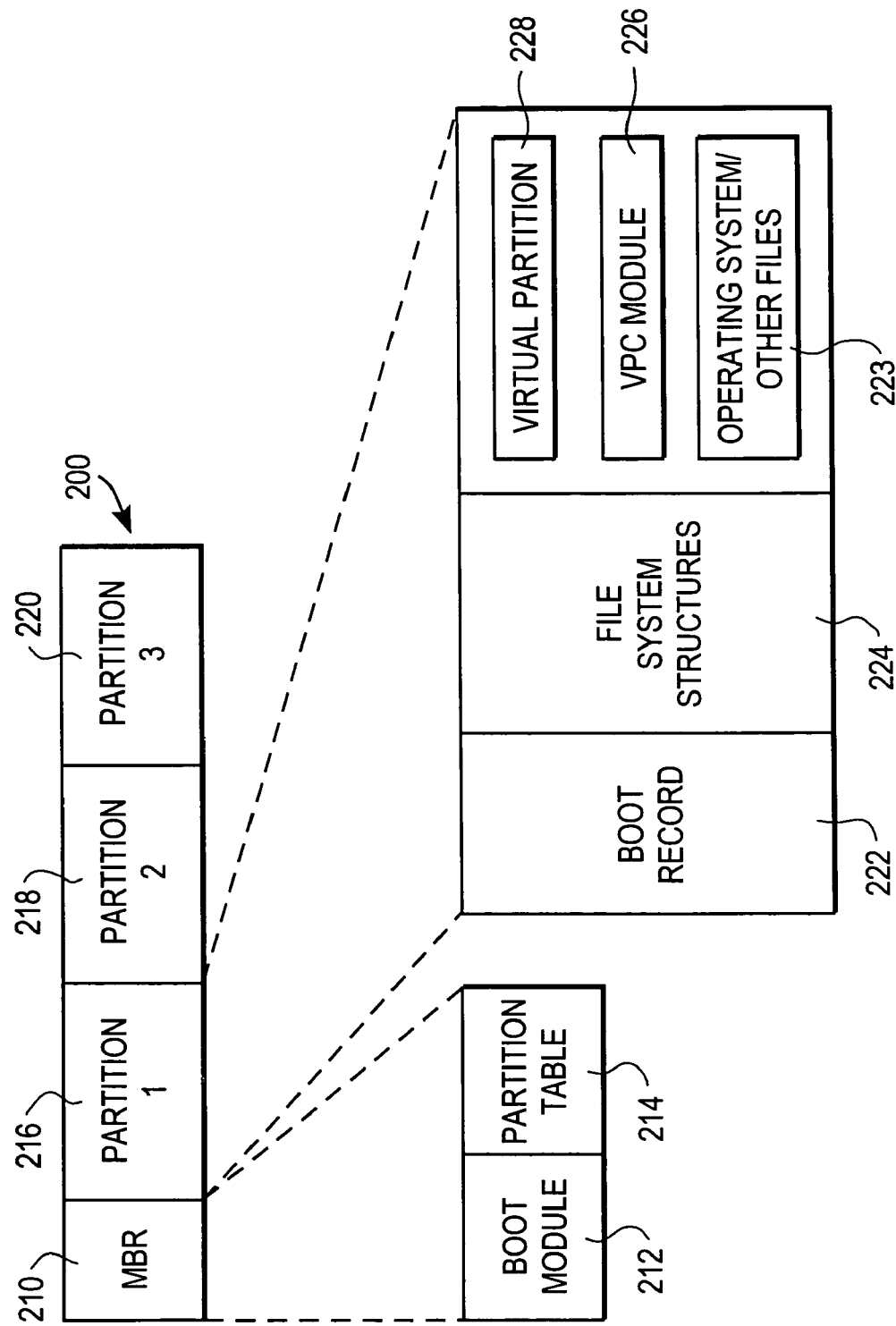
FIG. 2 is a block diagram illustrating a logical view of typical configuration of a hard disk drive 200 utilized as a storage device 108 in a computer system 100.

FIG. 2 is a block diagram illustrating a logical view of a typical configuration of a hard disk drive 200 utilized as a storage device 108 in a computer system 100. This description uses the term "hard drive" to refer to the hard disk drive and/or the hard disk that actually holds the content, depending upon the context. FIG. 2 illustrates only an example of a logical hard drive configuration, and embodiments of the present invention can be used with storage devices having physical and/or logical configurations different than the one shown in FIG. 2.

As is known in the art, a hard drive 200 typically has one or more platters of magnetic media. The media are divided into logical components called tracks, sectors, and clusters. A "track" is a circular ring of storage elements on the disk. A "sector" is the smallest addressable section of a track. A "cluster" (also called an "extent") is a set of one or more sectors and represents the smallest unit of storage elements that can be allocated to a file or other structure, although some file systems do not use clusters. In addition, a "cylinder" is the group of corresponding tracks on each platter. The hard drive 200 also has one or more heads that read from the platters.

In FIG. 2, the hard drive 200 stores a master boot record (MBR) 210 that holds information describing the logical structure of the drive. In a typical embodiment, the MBR 210 is located in the first physical sector of the hard drive and contains two logical components: the boot module 212 and the partition table 214. The boot module 212 contains executable code for initiating the operation of the computer system 100 when activated by code stored in the basic input/output system (BIOS), ROM, and/or NVRAM of the computer system.

The partition table 214 holds information describing the logical arrangement of storage on the drive 200. In general, a hard drive can be divided into one or more logical partitions. The partitions appear to the computer system 100 as logically distinct hard drives, even though the partitions reside within a single drive. The partition table 214 contains entries describing the parameters of each partition. For example, an entry may specify the heads, cylinders, and sectors forming the partition, the type of partition, and whether the partition is the boot partition. The hard drive 200 may have unallocated sectors that are not part of the MBR 210 or any partition.

The exemplary drive 200 illustrated in FIG. 2 is divided into three logical partitions 216, 218, 220. The first partition 216, in this example, is the boot partition. The other two partitions are similar to the first partition, but are not designated as the boot partition. As is known in the art, each partition is formatted according to a particular file system. For example, a partition may be formatted according to the FAT16, FAT32, HPFS, NTFS, or other file systems. The formatted partitions are adapted to hold files that contain executable code and/or data.

In most file systems, the boot partition holds a special module called the boot record 222. The boot record 222 holds instructions for booting (i.e., initiating the operation of) the computer system 100. Depending upon the file system for the partition, the boot record 222 may also access a file allocation table (FAT) (in the case of the FAT16 and FAT32 file systems) or a master file table (MFT) (in the case of NTFS file systems) that describes how the storage in the partition is allocated, including, e.g., the directory structure, bad sectors, etc. Those of skill in the art will recognize that other file systems may use different techniques to represent this information.

In FIG. 2, the first partition 216 holds files 223 forming the operating system for the computer system 100. The operating system might be, for example, MICROSOFT WINDOWS XP, WINDOWS 2000, WINDOWS ME, LINUX, APPLE OS X, or another operating system. Depending upon the embodiment, the other partitions 218, 220 may also hold operating system files that are the same, or different, than the operating system files held by the first partition 216. In general, the operating system files 223 are not treated differently than other files in the file system and can be stored in any valid location in the partition 216 and/or hard disk 200.

When a computer system 100 running the DOS or 32-bit WINDOWS operating system is booted, it loads and then executes the boot module 212 stored in the MBR 210. The boot module 212 examines the partition table 214, identifies the boot partition 216, and loads and executes the code in the boot record 222 for the partition. This code, in turn, loads and executes instructions stored in the operating system files 223, which cause the operating system to load and then control the computer system 100. Computer systems running other operating systems, such as LINUX or 64-bit WINDOWS (e.g., WINDOWS for INTEL ITANIUM-based computers) boot using different procedures, although the net effect is the same. Namely, modules in the memory 106 utilize data stored on the hard disk 200 and/or elsewhere in the computer system 100 to identify the boot partition 216 and load and execute the operating system contained therein.

Various application programs can be run on the computer system 100 under the control of the operating system. Many modern operating systems, such as those based on the MICROSOFT WINDOWS XP operating system, do not permit application programs executed by the operating system to perform certain tasks with respect to the data on the hard drive 200. It is desirable to permit certain application programs to perform these tasks.

Therefore, an embodiment of the present invention utilizes a VP client (VPC) module 226 stored in one or more files on the hard drive 200. The VPC module 226 creates a VP 228 on the hard drive 200, stores in the VP an operating system that permits the desired functionality, and alters the MBR 210 to cause the computer system to boot from the VP the next time the computer is booted. In FIG. 2, the VPC module 226 and VP 228 are illustrated within the first partition 216. This partition 216 is referred to as the "host" partition because it holds the VP 228. However, the VPC module 226 can just as easily be stored in another partition in the hard drive 200, outside of a partition, or on another computer-readable medium accessible to the computer system 100. Likewise, the VP 228 can be stored in any other storage device 108 in the computer system 100 adapted to store boot instructions and an operating system.

Figure 3:
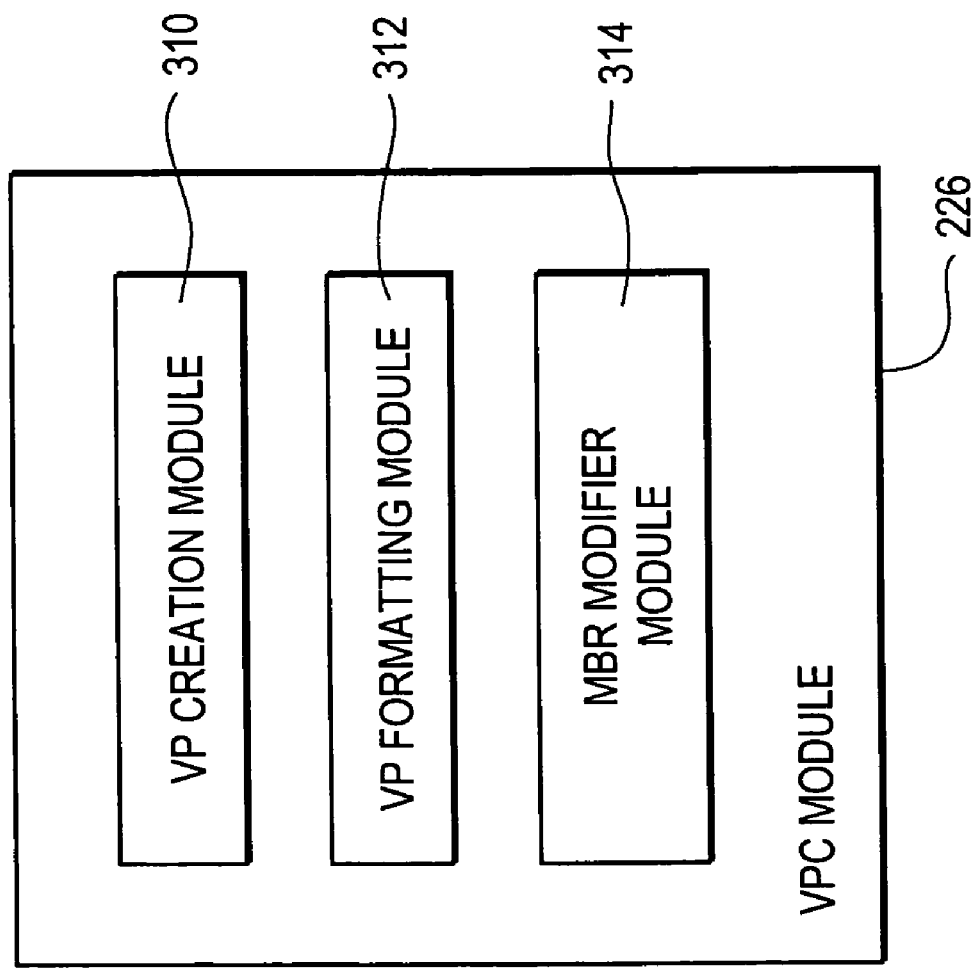
FIG. 3 is a block diagram illustrating a more detailed view of the VP client (VPC) module 226 of FIG. 2 according to an embodiment of the present invention.

FIG. 3 is a block diagram illustrating a more detailed view of the VPC module 226 according to an embodiment of the present invention. Other embodiments of the VPC module 226 may include different and/or additional modules or functionality than that described herein. A VP creation module 310 preferably stores program code logic for creating a file 228 on the host partition for holding the VP (both the VP file and the VP itself are identified by reference numeral 228 since they are preferably the same entity). The size of the VP file 228 depends upon the amount of operating system code and other information that will be stored in it, and also depends upon any constraints imposed by the file system of the host partition 216 and/or operating system. For example, the file system may have constraints on the maximum size of a file and/or the operating system may have file quotas that limit the amount of storage space available to an end user. The most restrictive of these constraints is the limit on the VP file's maximum size. In one embodiment, the VP file 228 is stored in the root directory of the host partition 216. Since the VP file 228 is created as a normal file, it does not require any special partitioning of the hard drive 200 and will not be inadvertently modified by the operating system or application programs.

Preferably, the VP creation module 310 takes steps to ensure that the VP file 228 is not fragmented (i.e., the VP file is stored in a single, contiguous space in the host partition 216). In one embodiment, the VP creation module 310 identifies a contiguous space and then creates the VP file 228 in that space. In another embodiment, the VP creation module 310 creates the VP file 228 and then tests it to determine whether it is contiguous. If the VP file 228 is not contiguous, the module 310 identifies a suitable space and moves the VP file to it. In either embodiment, if the VP creation module 310 cannot identify a suitable space, it preferably rearranges other files or file fragments in the host partition 216 to clear a suitable space and moves the VP file 228 to there. In another embodiment, the VP creation module 310 creates the VP file 228 in unpartitioned space on the hard drive 200.

Certain operating systems and file systems allow files and/or partitions on the hard drive to be compressed. For example, the WINDOWS 9x and ME operating systems can create compressed partitions that are embedded within non-compressed partitions. Similarly, the WINDOWS 2000 and XP operating systems can create compressed directories in a partition, including the root directory. If compression is active in the host partition 216, the VP creation module 310, in one embodiment, ensures that the VP file 228 is uncompressed. Under the WINDOWS 9x and ME operating systems, the VP creation module 310, in one embodiment, creates the VP file in the uncompressed partition encompassing the compressed partition. Under the WINDOWS 2000 and XP operating systems, the VP creation module 310, in one embodiment, uses functionality provided by the operating systems to disable compression for the VP file 228.

A VP formatting module 312 preferably stores program code logic for "formatting" the VP file 228 as if it were a separate partition. In one embodiment, the VP formatting module 312 formats the file so that it emulates a FAT16-formatted partition. As part of this process, the VP formatting module 312 places data structures in the VP file 228 that emulate the FAT and directory structure of a normal FAT16 file system. Other embodiments of the VP formatting module 312 format the VP to emulate other file systems. In some operating systems, partitions are expected to start at a track or cylinder boundary. In one embodiment, if the VP file 228 does not start on such a boundary, the VP formatting module 312 creates the file system data structures at a track or cylinder boundary within the VP file 228. In this case, the location of the data structures is referenced as the start of the VP 228 rather than the true start of the VP file.

In one embodiment, the VP creation module 310 allows the VP file 228 to be fragmented. Then, the VP formatting module 312 uses functionality within the file system with which the VP 228 is "formatted" to account for the spaces between the fragments forming the file. In one embodiment, the VP formatting module 312 uses structures within the VP (e.g., the FAT) to mark the spaces between the fragments as "bad" clusters, thereby letting the discontinuous file appear as a contiguous file having gaps of bad clusters. In another embodiment, the VP formatting module 312 marks spaces between the fragments as belonging to a particular file in the emulated file system.

The VP formatting module 312 also preferably writes operating system files into the VP 228. In one embodiment, the VP formatting module 312 obtains the files from another location on the hard drive 200 or via network adapter 116. In one embodiment, the operating system is DOS and the VP formatting module writes the PC-DOS command files IBMBIO.COM and IBMDOS.COM (or the MS-DOS equivalents IO.SYS and MSDOS.SYS) as the first two entries of the root directory of the VP 228. However, other embodiments can use different operating systems. The VP formatting module 312 also writes certain files that will be used when the computer is booted to DOS into the VP 228, such as mouse and network drivers, configuration files, batch files, and application files. In one embodiment, the application files are located outside the VP 228.

A MBR modifier module 314 preferably stores program code logic for modifying the boot module 212 and partition table 214 in the MBR 210 of the hard drive 200 to make the VP 228 the active boot partition. Preferably, the MBR modifier module 314 replaces the boot module 212 with program code causing the computer system 100 to boot the active partition. The MBR modifier module 314 also alters the partition table 214 to establish a real partition having the boundaries of the VP file 228 (or a boundary at the beginning of the emulated file system in the VP file) and makes this partition the active boot partition. Accordingly, when the computer system is booted, it will boot the operating system in the VP 228 rather than the one stored in the host partition or the other partitions on the hard drive 200. The MBR modifier module 314 also preferably saves the original MBR 210 as a file 422 in the VP 228.

The MBR modifier module 314 preferably replaces the original boot module 210 because some computer systems might have boot modules that do not necessarily boot the computer system from the active partition identified by the partition table 214. If a computer system 100 is known to have a standard boot module 210 that boots the active boot partition identified in the partition table 214, one embodiment of the MBR modifier module 314 modifies only the partition table. Modifying the partition table 214 in this manner does not require special code or functionality in the MBR 210. Rather, the MBR 210 follows the normal boot process to boot from the VP 228. In addition, other application programs that use and alter the MBR 210, such as FDISK, are unlikely to inadvertently damage the virtual partition or render it inaccessible. Those of skill in the art will recognize that other embodiments of the VPC module 226 can distribute the functionality of its various component modules in a manner different than the distribution described above.

Figure 4:
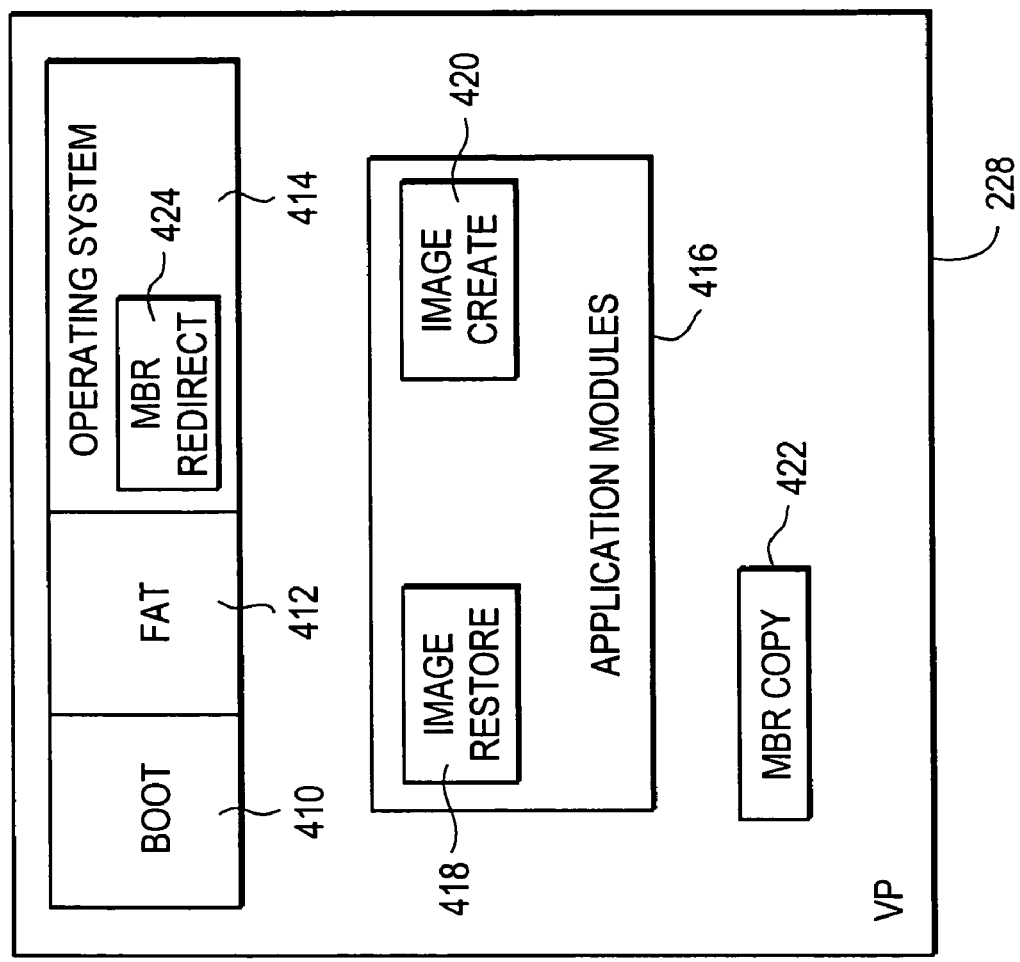
FIG. 4 is a high-level block diagram illustrating an embodiment of the VP 228 as created by the VPC module 226.

FIG. 4 is a high-level block diagram illustrating an embodiment of the VP 228 as created by the VPC module 226. The VP 228 contains a boot record 410, a FAT 412, the operating system files 414, and the file 422 containing a copy of the original MBR. As described above, the VP formatting module 312 may also install application files in the VP 228. FIG. 4 illustrates an exemplary set of application modules 416 for performing the functionality provided by the application files. It should be understood that other embodiments of the present invention may include different application modules, or include no application modules at all in the VP 228.

The application modules 416 in the VP 228 of FIG. 4 are designed to utilize the storage device 108 access functionality permitted under the operating system 414 installed in the VP. In one embodiment, the application modules 416 provide image restoration and image creation for the hard drive 200 containing the VP 228. FIG. 4 illustrates an image restore module 418 and an image create module 420 for performing these tasks. An "image" is a collection of data, such as a file or files, that specifies content on the storage device (108).

In one embodiment, the image restore module 418 contains program code logic for restoring an image onto a partition and/or hard drive 200 in the computer system 100. This functionality may be desirable, for example, when an end-user wishes to clone (i.e., make an exact or nearly exact copy of) the contents of another computer's hard drive onto the hard drive 200 of the computer system 100. In one embodiment, the image restore module 418 accomplishes this functionality by overwriting any content on the hard drive 200 with new files and/or other data structures as specified by the disk image.

The image restore module 418 is preferably "aware" of the VP 228 and can load the disk image around it. The image restore module 418 also preferably contains functionality for detecting a conflict between the image being loaded and the location of the VP 228 on the hard drive 200. For example, the image might specify that other files should be stored in the location of the VP file 228. Similarly, the VP file 228 might fall across partition boundaries or in the MFT area as specified by the image. In these cases, the image restore module 418 preferably detects the conflict and identifies a new, valid location for the VP file 228 on the hard drive 200. In one embodiment, this location is at the end of the host partition 216 because there are no restricted areas used by the FAT or NTFS file systems in that region. Other embodiments use other locations that are advantageous for the particular file system of the host partition 216. The image restore module 418 moves the VP 228 to the new location, updates the MBR 210 to reflect the change, and reboots the computer system 100.

In one embodiment, the image create module 420 contains program code logic for creating an image of the partition and/or hard drive 200. The image can be saved, for example, at previously-unused locations on the hard drive 200, on another hard drive, on a removable storage device such as a CD, or on a hard drive of another computer system connected via a network. Preferably, the image create module 420 is adapted to detect and skip the VP file 228 when creating the disk image.

The application modules 416 in the VP 228 often need to access the copy of the original MBR saved as a file 422 in the VP 228. For example, the image restore module 418 may need to alter the original MBR to reflect the restored image. In addition, the image create module 420 preferably uses the MBR saved as the file 422 as the MBR in the disk image it creates. In another example, the application modules 416 may need to access the original MBR in order to generate reports on disk layout. In one embodiment, the application modules 416 are "aware" of the VP 228 environment and "know" to use the copy of the original MBR saved in the file 422 for tasks that require access to the MBR. In another embodiment, a MBR redirect module 424 is loaded with the VP operating system 414. This module 424 redirects all application accesses to sector 0 of the hard drive 200 (the MBR sector) to the MBR copy 422 in the VP 228, thereby causing the applications to transparently utilize the original MBR. The MBR redirect module 424 is deactivated before the original MBR is restored from the file 422 in the VP 228 back to sector 0 of the hard drive 200. In one embodiment, the MBR redirect module 424 is implemented as a terminate-and-stay-resident (TSR) program.

Figure 5:
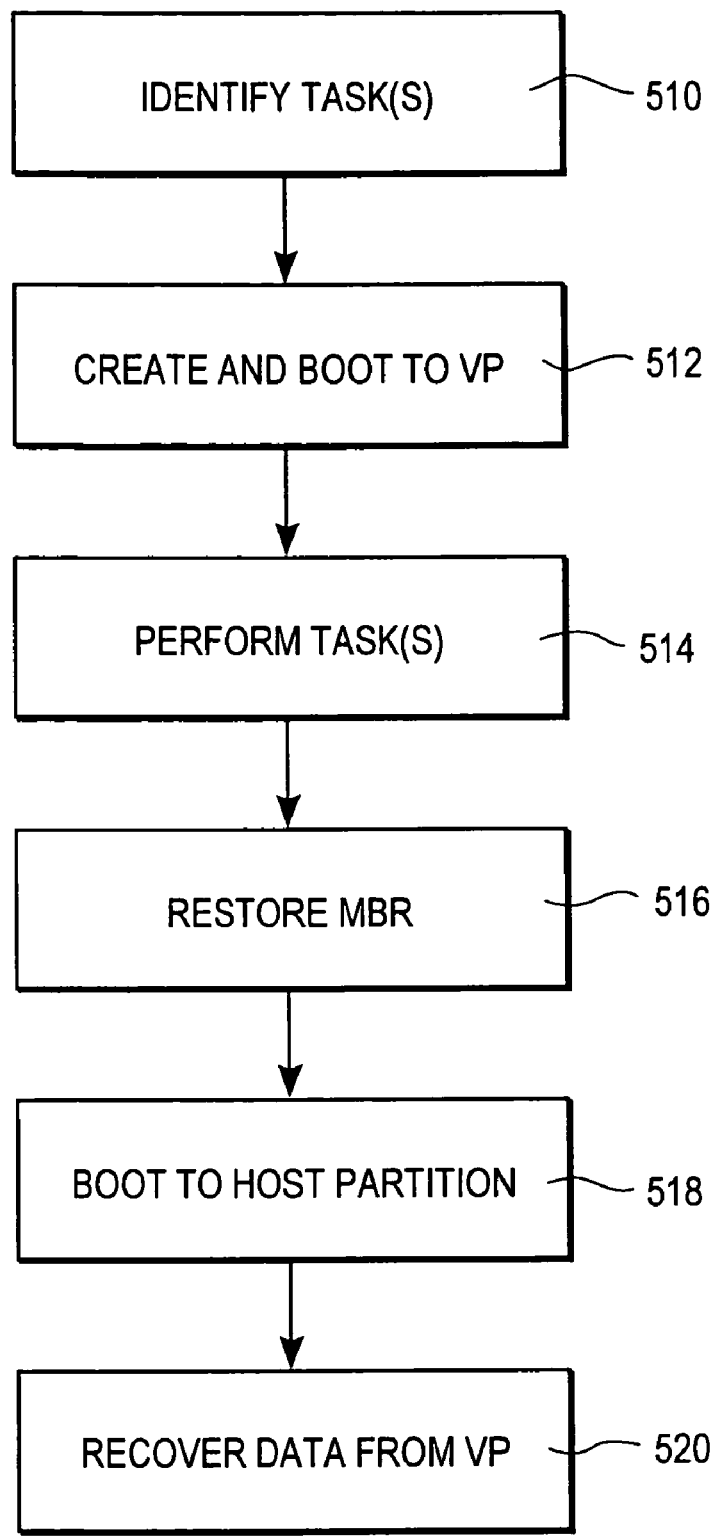
FIG. 5 is a flowchart illustrating exemplary steps utilizing the VP 228 to perform tasks not permitted under a computer system's normal operating system 223.

FIG. 5 is a flowchart illustrating exemplary steps utilizing the VP 228 to perform tasks not permitted under a computer system's normal operating system. Other embodiments of the present invention may perform different and/or additional steps than those described herein. In addition, the steps may be performed in different orders.

Initially, the task that requires functionality not permitted under the computer system's normal operating system is identified 510. This step may occur, for example, when an end-user provides an input to the computer system 100 indicating that it should restore an image onto, or create an image from, the hard drive 200 of the computer system 100. Alternatively, this step can occur when an automated process executing on the computer system 100 indicates that such a task should be performed.

In response, the computer system 100 executes the program modules to create 512 the virtual partition 228 on the hard drive 200 and boot to it. In one embodiment, the VP has already been created at this stage. Thus, the program modules boot from the already-created VP. The program modules then perform 514 the task or tasks that require functionality not permitted under the computer system's normal operating system. Once the tasks are completed, the program modules preferably restore the MBR 210 to its original configuration (or the configuration produced as a result of the performed task) and boot the computer system 100 to the operating system installed in the host partition 216 (i.e., the operating system other than the one in the VP 228).

Once the computer is rebooted, program modules executed in the restored operating system may need to recover 520 data, such as the operational status and logs, from the VP 228. However, in certain circumstances, such as when an image is restored onto the hard drive 200, indicia of the VP file 228 no longer exist on the hard drive. The data formerly in the VP 228 reside on the hard drive, but are no longer marked as being within a file.

In order to recover data from a VP 228 that is no longer marked as a file, the program modules determine the location of the VP 228. There are several techniques used by embodiments of the program modules to find the location of the VP 228. One technique is for program modules executing in the VP 228 to store the location of the VP in a designated sector of the hard disk 200 (e.g., sector 62, which is outside of any partition), which is later read by the program modules executing in the restored operating system. Another technique is for the program modules in the restored operating system to do a brute force search of the hard disk for a "signature" of the VP. In one embodiment, this search examines only track boundaries since the VP 228 starts at such a boundary. In addition, the program modules preferably remove the signature once the data are recovered in order to avoid identifying old VP files during subsequent searches. A third technique is for the image restore module 418 or another module to create a file in the restored file system that matches boundaries and/or contents of the VP file 228.

Figure 6:
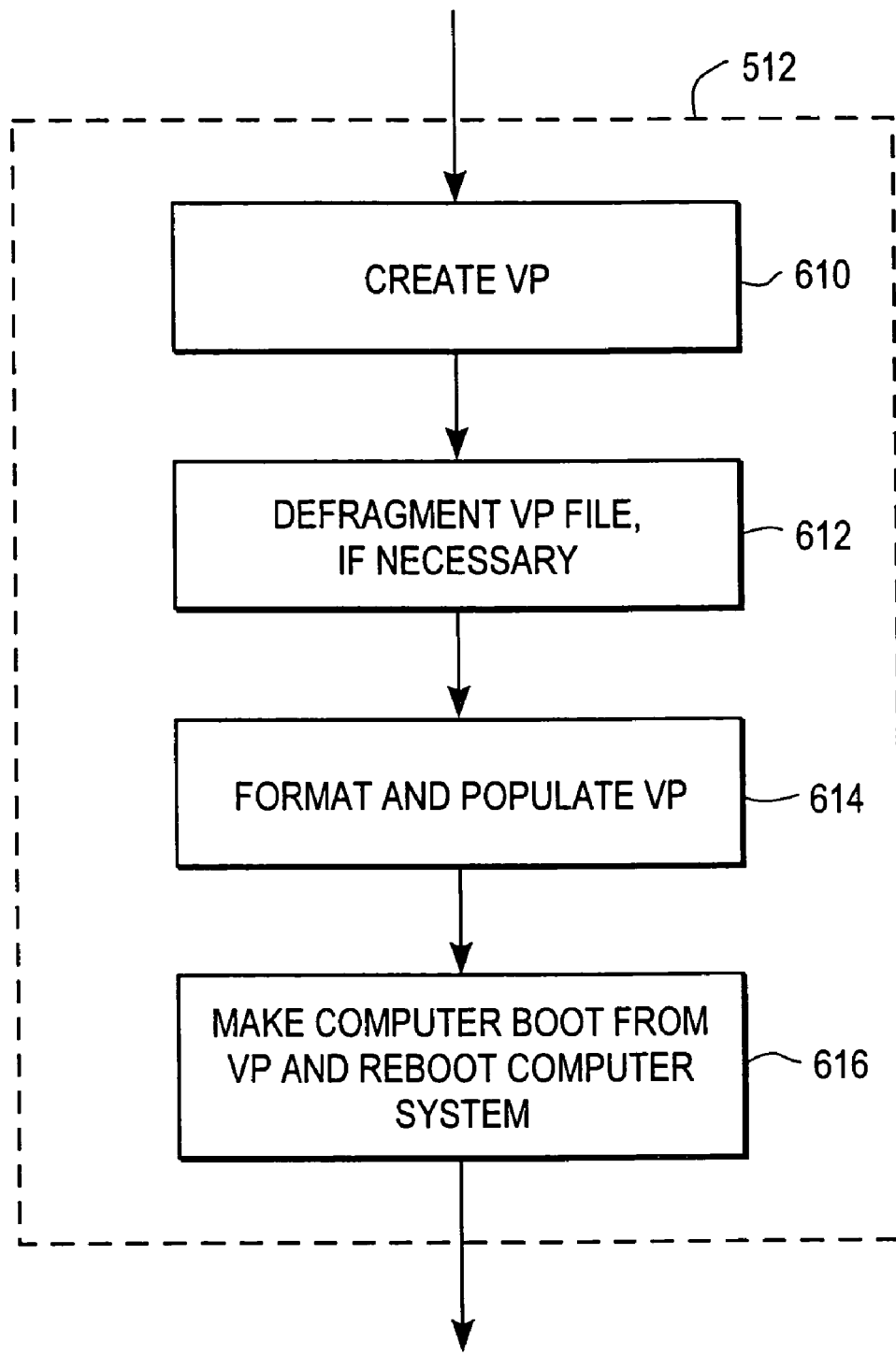
FIG. 6 is a flowchart illustrating a more detailed view of the steps involved in step 512, creating and booting a VP, according to one embodiment of the present invention.

FIG. 6 is a flowchart illustrating a more detailed view of the steps of involved in step 512, creating and booting a VP, according to one embodiment of the present invention. Other embodiments of the present invention may perform different and/or additional steps than those described herein. In addition, the steps may be performed in different orders. Initially, modules in the computer system 100 create 610 the VP file 228 in the host partition 216. The modules also defragment 612 the VP file, if necessary. The modules format the VP file 228 and populate 614 it with files for its operating system. Moreover, the modules configure 616 the computer system 100 to boot from the VP 228, preferably by altering the MBR 210, and reboot the computer system.

Figure 7:
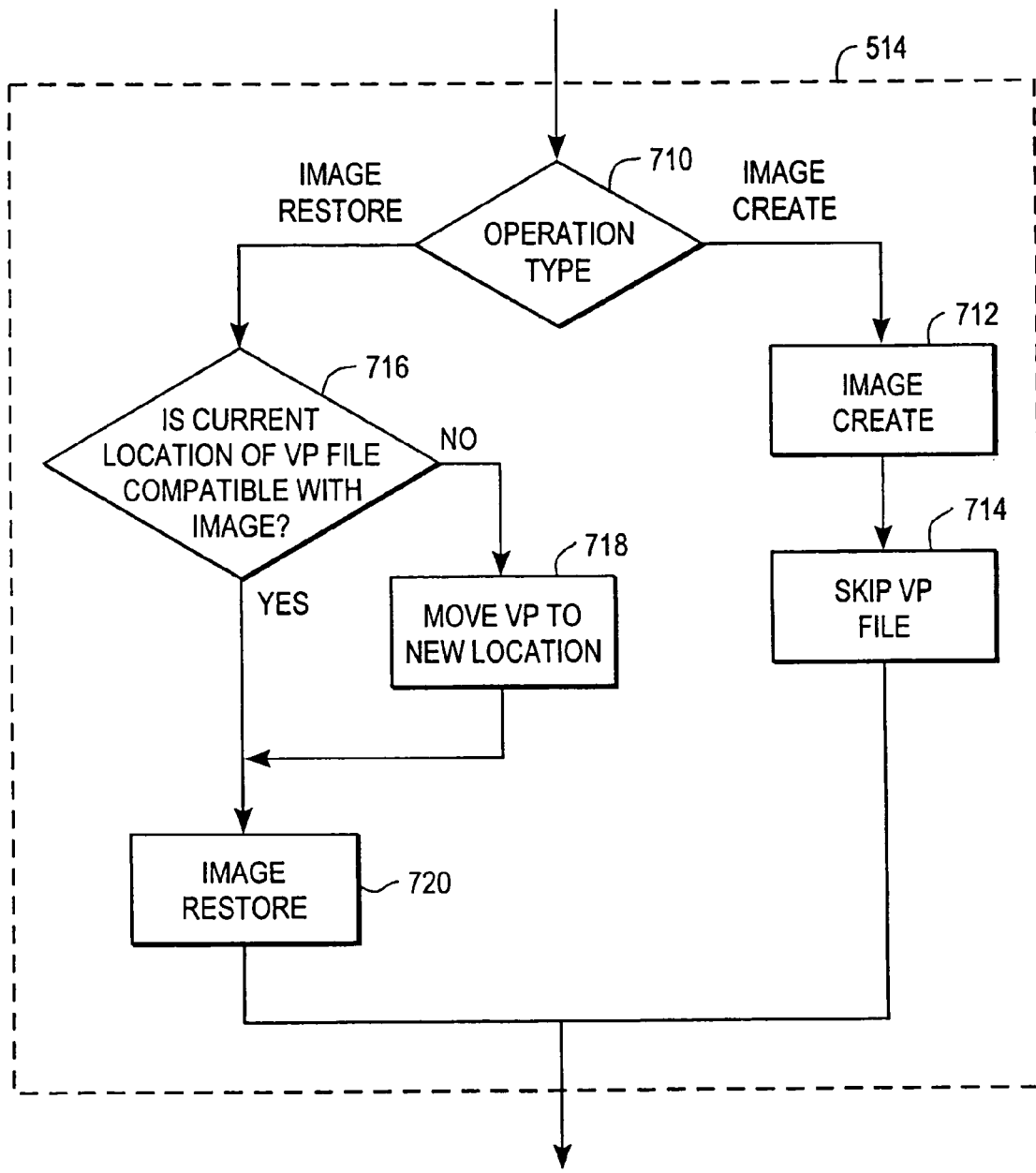
FIG. 7 is a flowchart illustrating a more detailed view of the steps involved in step 514, performing the task or tasks that require functionality not permitted under the computer system's normal operating system, according to one embodiment of the present invention.

FIG. 7 is a flowchart illustrating a more detailed view of the steps involved in step 514, performing the task or tasks that require functionality not permitted under the computer system's normal operating system, according to an embodiment of the present invention. It should be understood that these steps are illustrative only, and that other embodiments of the present invention may perform different and/or additional steps than those described herein in order to perform different and/or additional tasks. Furthermore, the steps can be performed in different orders than the steps described herein.

Initially, program modules executed by the computer system 100 determine 710 the type of operation requested by the end-user and/or other modules on the computer system. In the example of FIG. 7, there are two operation types: 1) restore an image onto the hard drive 200; and 2) create an image from the contents of the hard drive. If 710 the "image create" operation type is selected, the program modules preferably read the contents of the hard drive 200 and create 712 the disk image. Accordingly, the resulting disk image reflects the contents of the hard drive 200 before the VP was created.

If 710 the "image restore" operation type is requested, the program modules preferably determine 716 whether the current location of the VP file 228 is compatible with the image being loaded. If the location is not compatible, the program modules preferably move 718 the VP file 228 to a new location that is compatible with the image. Once the VP file 228 is in a compatible location, the program modules preferably restore 720 the image onto the hard drive 200.

Accordingly, the present invention allows an application program or other program modules to perform tasks normally not permitted by the host operating system. The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

We claim:

1. A method for performing a task on a computer system having a first operating system installed on a storage device associated with the computer system, the method comprising:

creating a virtual partition on the storage device associated with the computer system;

installing a second operating system in the virtual partition;

adapting the storage device to boot the computer system from the second operating system in the virtual partition; and performing the task on the computer system through the second operating system, wherein the task is not permitted under the first operating system but is permitted under the second operating system, and wherein the task is selected from a group consisting of: creating an image of at least some of the storage device, wherein the image does not include the virtual partition and restoring an image onto the storage device, the image containing executable code and data for use on the computer system.

2. The method of claim 1, further comprising:

responsive to completion of the task, restoring the storage device to boot the computer system from the first operating system installed on the storage device.

3. The method of claim 2, further comprising:

removing indicia identifying the virtual partition from the storage device;

booting the computer system from the first operating system;

determining a location of the virtual partition on the storage device; and recovering data from the virtual partition.

4. The method of claim 1, wherein creating a virtual partition comprises:
  creating the virtual partition file in the storage device.

5. The method of claim 4, further comprising:
  defragmenting the virtual partition file.

6. The method of claim 4, wherein the virtual partition file is discontinuous, further comprising:
  marking gaps between portions of the virtual partition file as bad allocation units in the first operating system.

7. The method of claim 1, wherein the storage device is a hard drive and wherein the virtual partition file is aligned on a track boundary of the hard drive.

8. A computer system comprising a storage device having a first operating system installed thereon, the storage device further storing:
  a virtual partition creation module adapted to create a virtual partition on the storage device;
  a virtual partition formatting module adapted to install a second operating system in the virtual partition;
  a modifier module adapted to modify the storage device to boot the computer system from the second operating system in the virtual partition; and
  an application module adapted to perform a task on the computer system through the second operating system, wherein the task is not permitted under the first operating system but is permitted under the second operating system, and wherein the application module further comprises a module selected from a group consisting of: an image create module adapted to create an image of at least some of the storage device, wherein the image does not include the virtual partition, and an image restore module adapted to restore an image onto the storage device, the image containing executable code and data for use on the computer system.

9. The computer system of claim 8, wherein the modifier module is further adapted to restore the storage device to boot the computer system from the first operating system installed on the storage device responsive to completion of the task.

10. The computer system of claim 9, wherein the modifier module is further adapted to remove indicia identifying the virtual partition from the storage device, to boot the computer system from the first operating system, to determine a location of the virtual partition on the storage device, and to recover data from the virtual partition.

11. The computer system of claim 8, wherein the virtual partition creation module is further adapted to create the virtual partition as a virtual partition file in the storage device.

12. The computer system of claim 11, wherein the virtual partition creation module is further adapted to defragment the virtual partition file.

13. The computer system of claim 11, wherein the virtual partition file is discontinuous, and wherein the virtual partition formatting module is further adapted to mark gaps between portions of the virtual partition file as bad allocation units in the first operating system.

14. The computer system of claim 8, wherein the storage device is a hard drive and wherein the virtual partition file is aligned on a track boundary of the hard drive.

15. A computer program installed on a storage device associated with a computer system for performing a task on the computer system having a first operating system, the computer program containing executable computer program code for performing a method comprising:
  creating a virtual partition on the storage device associated with the computer system;
  installing a second operating system in the virtual partition;
  adapting the storage device to boot the computer system from the second operating system in the virtual partition; and
  performing the task on the computer system through the second operating system, wherein the task is not permitted under the first operating system but is permitted under the second operating system, and wherein the task is selected from a group consisting of: creating an image of at least some of the storage device, wherein the image does not include the virtual partition and restoring an image onto the storage device, the image containing executable code and data for use on the computer system.

16. The computer program of claim 15, wherein the method further comprises:
  responsive to completion of the task, restoring the storage device to boot the computer system from the first operating system installed on the storage device.

17. The computer program of claim 16, wherein the method further comprises:
  removing indicia identifying the virtual partition from the storage device;
  booting the computer system from the first operating system;
  determining a location of the virtual partition on the storage device; and
  recovering data from the virtual partition.

18. The computer program of claim 15, wherein creating the virtual partition comprises:
  creating the virtual partition as a virtual partition file in the storage device.

19. The computer program of claim 18, wherein the method further comprises:
  defragmenting the virtual partition file.

20. The computer program of claim 18, wherein the virtual partition file is discontinuous, and wherein the method further comprises:
  marking gaps between portions of the virtual partition file as bad allocation units in the first operating system.

* * * * *

UNITED STATES PATENT AND TRADEMARK OFFICE
CERTIFICATE OF CORRECTION

| | |
|---|---|
| PATENT NO. | : 7,519,806 B2 |
| APPLICATION NO. | : 11/356906 |
| DATED | : April 14, 2009 |
| INVENTOR(S) | : Robert Stutton et al. |

It is certified that error appears in the above-identified patent and that said Letters Patent is hereby corrected as shown below:

Column 11, line 3, add "as a virtual partition file" after --creating the virtual partition-- so it reads --creating the virtual partition as a virtual partition file in the storage device--

Signed and Sealed this

Thirtieth Day of June, 2009

JOHN DOLL
*Acting Director of the United States Patent and Trademark Office*